US009697735B2

(12) United States Patent
Michiguchi et al.

(10) Patent No.: US 9,697,735 B2
(45) Date of Patent: Jul. 4, 2017

(54) DRIVE ASSISTANCE DEVICE

(75) Inventors: Masayoshi Michiguchi, Kanagawa (JP); Tatsuto Ryugo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 352 days.

(21) Appl. No.: 14/365,323

(22) PCT Filed: Sep. 14, 2012

(86) PCT No.: PCT/JP2012/005865
§ 371 (c)(1),
(2), (4) Date: Jun. 13, 2014

(87) PCT Pub. No.: WO2013/088613
PCT Pub. Date: Jun. 20, 2013

(65) Prior Publication Data
US 2014/0327776 A1    Nov. 6, 2014

(30) Foreign Application Priority Data

Dec. 15, 2011  (JP) ................................. 2011-274174

(51) Int. Cl.
  *G08G 1/16*       (2006.01)
  *B60R 1/00*       (2006.01)
  *B60R 21/00*      (2006.01)
(52) U.S. Cl.
  CPC .............. *G08G 1/168* (2013.01); *B60R 1/00* (2013.01); *B60R 1/002* (2013.01); *G08G 1/166* (2013.01);
(Continued)

(58) Field of Classification Search
  CPC ............................. G08G 1/168; G06K 9/791
  See application file for complete search history.

(56) References Cited

U.S. PATENT DOCUMENTS

2006/0088190 A1   4/2006  Chinomi
2006/0119472 A1   6/2006  Tsuboi
(Continued)

FOREIGN PATENT DOCUMENTS

CN    1287532 A    3/2001
CN    1801216 A    7/2006
(Continued)

OTHER PUBLICATIONS

Chinese Search Report for Application No. 201280061029.X.
International Search Report for Application No. PCT/JP2012/005865 dated Oct. 30, 2012.

*Primary Examiner* — Sath V Perungavoor
*Assistant Examiner* — Patricia I Young
(74) *Attorney, Agent, or Firm* — Pearne & Gordon, LLP

(57) ABSTRACT

The device comprises: a first image capture means (7) for image capturing a host vehicle vicinity; a sonar (12) which senses an object in the host vehicle vicinity; a second image capture means (14) for image capturing the left front corner of the host vehicle; an image compositing means for forming a bird's-eye image on the basis of the images which are captured with the first image capture means (7) and the second image capture means (14); and a control means (5) for controlling a switch of a display of a display means (13). The control means (5) establishes the display switch condition of the display means (13) on the basis of the travel state of the host vehicle when the sonar (12) senses the object and the travel state of the host vehicle when the sonar (12) does not sense the object.

8 Claims, 15 Drawing Sheets

| RUNNING STATE WHEN SONAR SECTION MAKES DETECTION | | | RUNNING STATE WHEN SONAR SECTION MAKES NO DETECTION | | | |
|---|---|---|---|---|---|---|
| CLOSEST SONAR SECTION | GEARSHIFT | ESTIMATED VEHICLE STATE | P | STOPPED WITH D OR R | MOVING WITH D | MOVING WITH R |
| FRONT | P | STOP | SCENE 1 T1 | SCENE 2 T2 | SCENE 3 D3 | SCENE 4 D4 |
|  | D | FORWARD MOVEMENT | SCENE 5 T5 | SCENE 6 T6 | SCENE 7 D7 | SCENE 8 D8 |
|  | R | BACKWARD MOVEMENT | SCENE 9 T9 | SCENE 10 T10 | SCENE 11 D11 | SCENE 12 D12 |
| REAR | P,D,R | ALL STATES | SCENE 13 T13 | SCENE 14 T14 | SCENE 15 T15 | SCENE 16 T16 |

TRANSITION CONDITION IN EACH SCENE WHERE Tx REPRESENTS TIME AND Dx REPRESENTS MOVING DISTANCE

(52) U.S. Cl.
CPC ... *B60R 2300/301* (2013.01); *B60R 2300/303* (2013.01); *B60R 2300/607* (2013.01); *B60R 2300/70* (2013.01); *B60R 2300/802* (2013.01)

(56) References Cited

U.S. PATENT DOCUMENTS

| | | |
|---|---|---|
| 2007/0299572 A1 | 12/2007 | Okamoto et al. |
| 2010/0070139 A1 | 3/2010 | Ohshima et al. |
| 2011/0095910 A1 | 4/2011 | Takano |
| 2013/0010117 A1 | 1/2013 | Miyoshi et al. |

FOREIGN PATENT DOCUMENTS

| | | | |
|---|---|---|---|
| CN | 1921621 A | | 2/2007 |
| CN | 101277432 A | | 10/2008 |
| CN | 101676149 A | | 3/2010 |
| CN | 101995239 A | | 3/2011 |
| CN | 102056772 A | | 5/2011 |
| JP | 2006-131166 A | | 5/2006 |
| JP | 2007104373 A | * | 4/2007 |
| JP | 2008-213744 A | | 9/2008 |
| JP | 2010-064750 A | | 3/2010 |
| JP | 2010143442 A | | 7/2010 |
| JP | 2010-184606 A | | 8/2010 |
| JP | 2011-205514 A | | 10/2011 |

\* cited by examiner

| CLOSEST SONAR SECTION | RUNNING STATE WHEN SONAR SECTION MAKES DETECTION | | | RUNNING STATE WHEN SONAR SECTION MAKES NO DETECTION | | | |
|---|---|---|---|---|---|---|---|
| | GEARSHIFT | ESTIMATED VEHICLE STATE | | P | STOPPED WITH D OR R | MOVING WITH D | MOVING WITH R |
| FRONT | P | STOP | | SCENE 1 T1 | SCENE 2 T2 | SCENE 3 D3 | SCENE 4 D4 |
| | D | FORWARD MOVEMENT | | SCENE 5 T5 | SCENE 6 T6 | SCENE 7 D7 | SCENE 8 D8 |
| | R | BACKWARD MOVEMENT | | SCENE 9 T9 | SCENE 10 T10 | SCENE 11 D11 | SCENE 12 D12 |
| REAR | P,D,R | ALL STATES | | SCENE 13 T13 | SCENE 14 T14 | SCENE 15 T15 | SCENE 16 T16 |

TRANSITION CONDITION IN EACH SCENE WHERE Tx REPRESENTS TIME AND Dx REPRESENTS MOVING DISTANCE

FIG. 9

DRIVE ASSISTANCE DEVICE

TECHNICAL FIELD

The present invention relates to a drive assistance apparatus that issues an alarm indicating a potential collision with an obstacle during parking.

BACKGROUND ART

Heretofore, there has been known a drive assistance apparatus configured to provide driving assistance by switching an all-around overhead view image to a camera image or displaying a camera image on an overhead view image in a superimposed manner when an object approaches the vehicle, in linkage with the detection state of the object (see Patent Literature (hereinafter, referred to as "PTL") 1, and PTL 2, for example).

CITATION LIST

Patent Literature

PTL 1
Japanese Patent Application Laid-Open No. 2011-205514
PTL 2
Japanese Patent Application Laid-Open No. 2006-131166

SUMMARY OF INVENTION

Technical Problem

However, when the object is no longer within the detection range covered by the object detector such as sonar, the image being displayed on the display returns to the image indicating the undetected state although the object still exists near the vehicle.

An object of the present invention is thus to provide a drive assistance apparatus that can continue displaying the image that is displayed when an object is detected, even after the object is no longer detected, based on a detection state of the object and in accordance with a driving state.

Solution to Problem

In order to achieve the object described above, the present invention has a feature in that a transition condition for a display image of a display unit is determined based on the running state of a host vehicle when an object detector detects an object and the running state of the host vehicle when the object detector no longer detects the object.

Advantageous Effects of Invention

The present invention brings about the effect of allowing a driver to easily and visually know the presence of an object near the vehicle because the displaying of the image displayed when the object is detected is continued in accordance with the driving state of the vehicle in a situation where the object is no longer within the detection range covered by the object detector but still exists near the vehicle.

BRIEF DESCRIPTION OF DRAWINGS

FIG. 9 is a diagram for describing transition conditions in step S59 of FIG. 5;

DESCRIPTION OF EMBODIMENT

Hereinafter, a description will be given of a drive assistance apparatus according to an embodiment of the present invention with reference to the accompanying drawings. This embodiment will be described, assuming that the vehicle includes the steering wheel on the right side.

Figure 1:
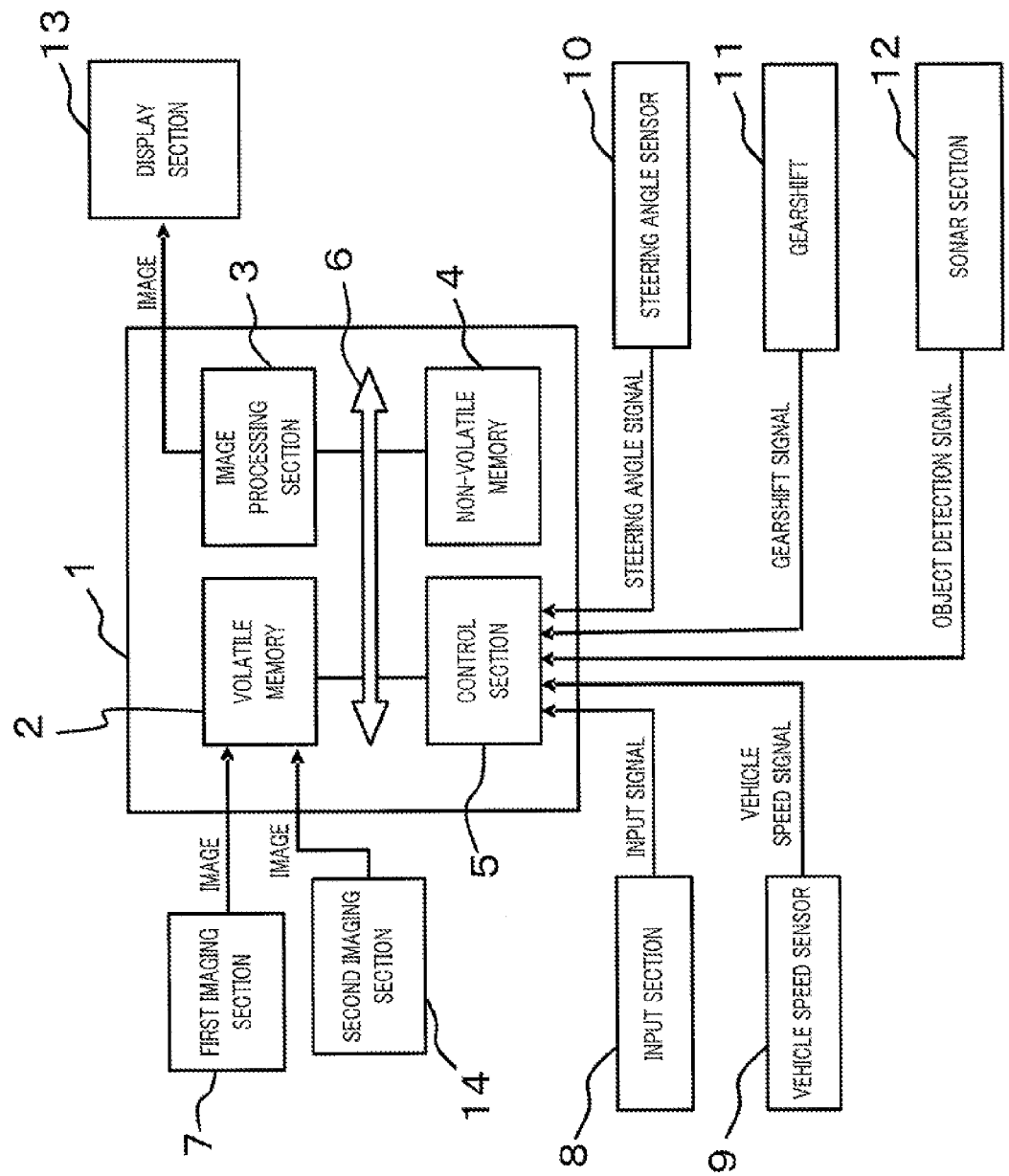
FIG. 1 is a block diagram illustrating a configuration of a drive assistance apparatus according to an embodiment of the present invention.

FIG. 1 is a block diagram illustrating a configuration of the drive assistance apparatus according to the embodiment of the present invention.

In FIG. 1, drive assistance apparatus 1 is configured of an imaging electric control unit (ECU) configured to perform image processing and includes volatile memory 2, image processing section 3, non-volatile memory 4, control section 5, and bus 6 for connecting these components with each other. Drive assistance apparatus 1 is connected to first imaging section 7, input section 8, vehicle speed sensor 9, steering angle sensor 10, gearshift 11, sonar section 12, display section 13, and second imaging section 14. Drive assistance apparatus 1 may include input section 8, vehicle speed sensor 9, steering angle sensor 10, gearshift 11, sonar section 12, display section 13, and second imaging section 14.

Volatile memory 2 includes a video memory or a random access memory (RAM), for example. Volatile memory 2 is connected to first imaging section 7. In addition, volatile memory 2 is connected to second imaging section 14. Volatile memory 2 temporarily stores image data obtained from captured images which are received from first imaging section 7 and second imaging section 14 at every predetermined time. The image data stored in volatile memory 2 is outputted to image processing section 3 through bus 6.

Image processing section 3 includes an application specific integrated circuit (ASIC) or very large scale integration (VLSI), for example. Image processing section 3 is connected to display section 13. Image processing section 3 performs conversion of a viewpoint on the image data received from volatile memory 2 and creates an overhead view image on which the image data received from non-volatile memory 4 is superimposed, every predetermined time. Image processing section 3 may create a combined image in which an ordinary image without being subjected to the conversion of a viewpoint is arranged with an overhead view image. The technique disclosed in International Publication No. WO 00/64175 can be used as a method for converting a viewpoint, for example. Image processing section 3 outputs the combined image which is created every predetermined time to display section 13 as the image to be displayed.

Non-volatile memory 4 includes a flash memory or a read only memory (ROM), for example. Non-volatile memory 4 stores a variety of image data such as image data of a vehicle that is an assisting target of the drive assistance apparatus (hereinafter, referred to as "host vehicle") and a data table related to a display method in accordance with a driving state. The image data stored in non-volatile memory 4 is read out in response to a command from control section 5 and is used for a variety of image processing operations by image processing section 3.

Control section 5 includes a central processing unit (CPU) or large scale integration (LSI), for example. Control section 5 is connected to input section 8, vehicle speed sensor 9, steering angle sensor 10, gearshift 11, and sonar section 12. Control section 5 controls the image processing operations of image processing section 3, reading out of data from volatile memory 2 or non-volatile memory 4, input from first imaging section 7 or second imaging section 14, and output to display section 13, for example, on the basis of a variety of signals received from input section 8, vehicle speed sensor 9, steering angle sensor 10, gearshift 11, and sonar section 12.

First imaging section 7 includes four cameras. Meanwhile, second imaging section 14 includes at least one camera. First imaging section 7, and second imaging section 14 input captured images at every predetermined time to volatile memory 2 of drive assistance apparatus 1. First imaging section 7 is installed on a vehicle body so as to be capable of capturing images of the entire periphery of the host vehicle. In addition, second imaging section 14 is installed at least on a left front corner of the vehicle. The positions of the vehicle body to which first imaging section 7 and second imaging section 14 are attached will be described below.

Figure 2:
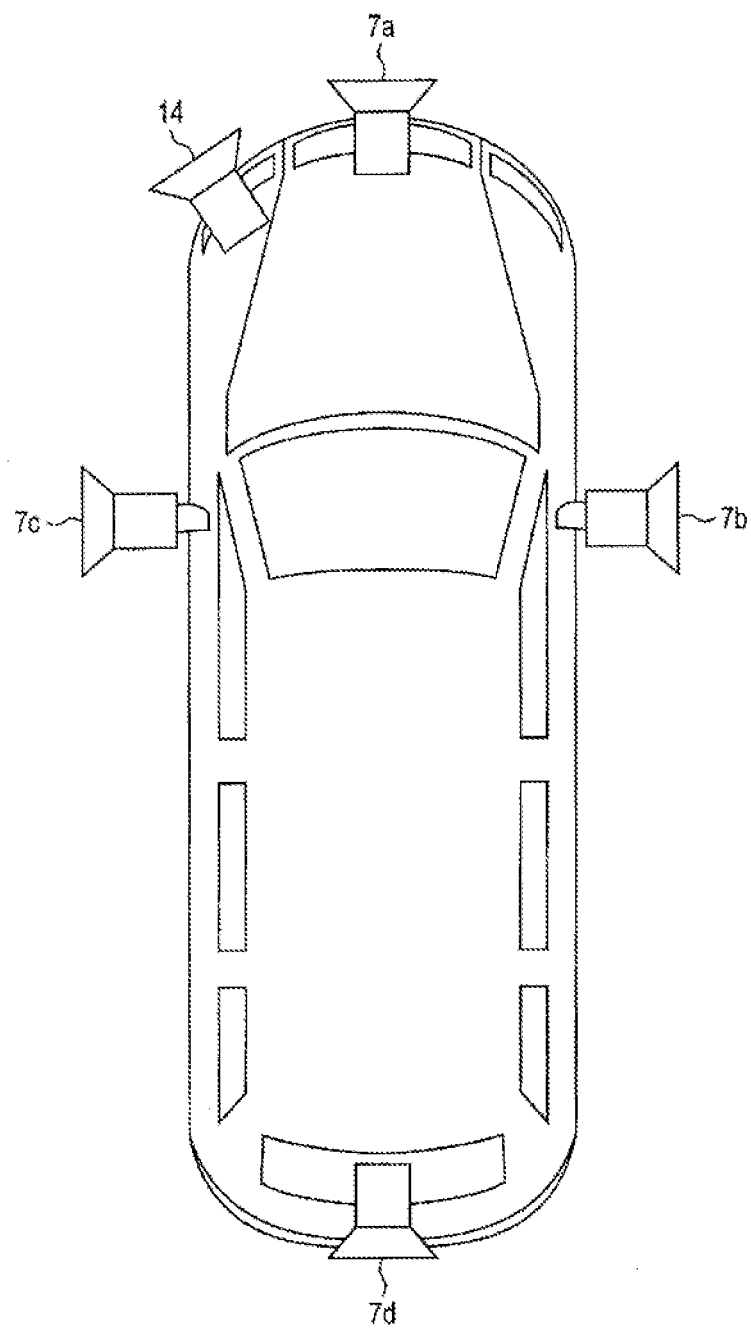
FIG. 2 is a diagram illustrating the positions of a vehicle to which first and second imaging sections are attached, the first and second imaging sections being a primary portion of FIG. 1.

FIG. 2 is a diagram illustrating where first imaging section 7 and second imaging section 14 are attached to the vehicle. As illustrated in FIG. 2, first imaging section 7 includes front camera 7a, right camera 7b, left camera 7c, and rear camera 7d. For example, front camera 7a and rear camera 7d are attached to the front and rear bumpers of the vehicle body, respectively. Right camera 7b and left camera 7c are mounted to the lower portions of right and left door mirrors of the host vehicle, respectively, for example. Meanwhile, second imaging section 14 is attached at least to the left front corner of the host vehicle.

Input section 8 includes a touch panel, a remote controller, or a switch, for example. When input section 8 is a touch panel, the input section may be provided on display section 13.

Vehicle speed sensor 9, steering angle sensor 10, gearshift 11, and sonar section 12 output a vehicle speed signal indicating the vehicle speed of the host vehicle, a steering angle signal indicating the steering angle of the same, a gearshift signal indicating the state of the gearshift of the same, and the detected signal and distance signal of an object to control section 5, respectively. Sonar section 12 includes eight sonar units which are attached to four corner positions of the vehicle body of the host vehicle and four positions of the front and rear positions of the vehicle body. The positions of the vehicle body to which the sonar units of sonar section 12 are attached will be described below.

Figure 3:
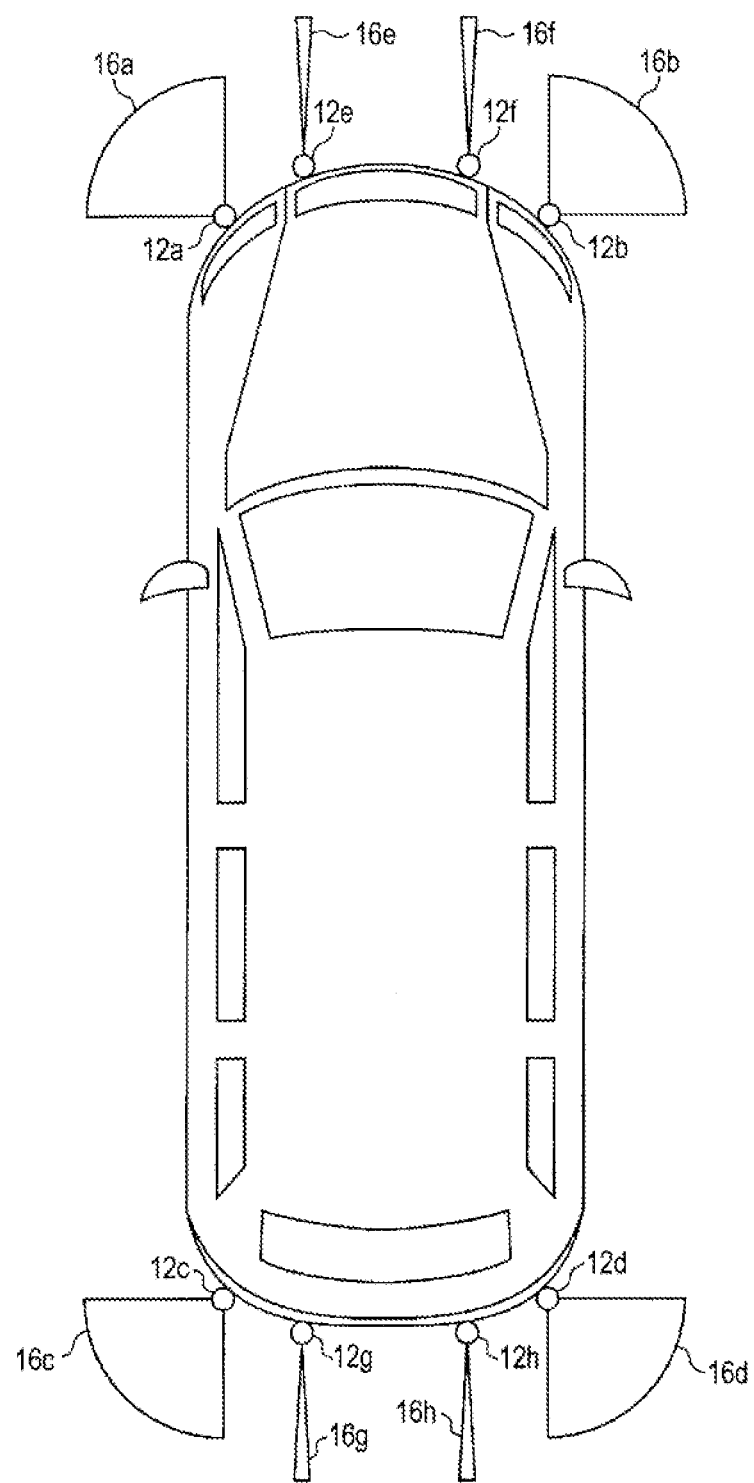
FIG. 3 is a diagram illustrating the positions of a vehicle to which sonar units are attached, the sonar units being a primary portion of FIG. 1.

FIG. 3 is a diagram illustrating the positions of the vehicle to which the sonar units of sonar section 12 are attached. As illustrated in FIG. 3, sonar section 12 includes left front corner sonar unit 12a, right front corner sonar unit 12b, left rear corner sonar unit 12c, right rear corner sonar unit 12d, left front sonar unit 12e, right front sonar unit 12f, left rear sonar unit 12g, and right rear sonar unit 12h. As illustrated in FIG. 3, horizontal plane detection ranges 16e to 16h of left front sonar unit 12e, right front sonar unit 12f, left rear sonar unit 12g, and right rear sonar unit 12h are set to be narrower than corresponding horizontal plane detection ranges 16a to 16d of left front corner sonar unit 12a, right front corner sonar unit 12b, left rear corner sonar unit 12c, and right rear corner sonar unit 12d. Next, the relation between the detection range of left front corner sonar unit 12a and the angle of view of second imaging section 14 will be described.

Figure 4:
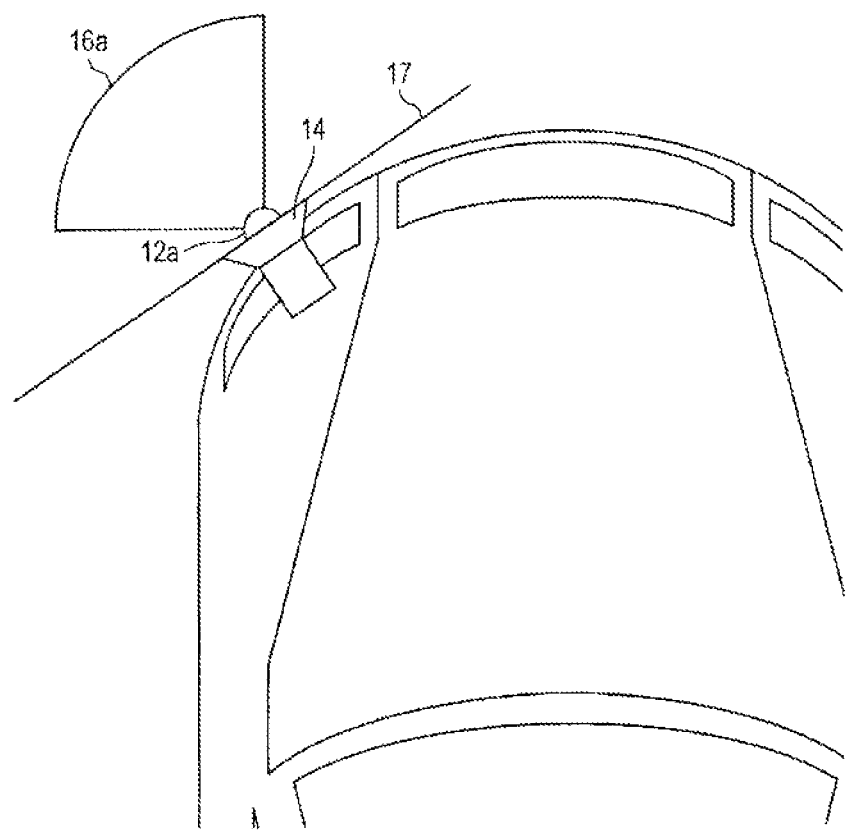
FIG. 4 is a diagram illustrating the angle of view of the second imaging section and the detection range of a sonar unit using a horizontal plane drawing, the second imaging section and sonar unit being a primary portion of FIG. 1.

FIG. 4 is a diagram for describing the angle of view of second imaging section 14 and the horizontal plane detection range of left front corner sonar unit 12a. As illustrated in FIG. 4, the angle of view 17 of second imaging section 14 is set to approximately 180 degrees in a horizontal plane. In addition, detection range 16a of left front corner sonar unit 12a is included within the angle of view 17 of second imaging section 14. That is, the entirety of detection range 16a of left front corner sonar unit 12a is included within the angle of view 17 of second imaging section 14.

It is preferable that second imaging section 14 be attached to a higher position of the vehicle body than left front corner sonar unit 12a. This is because the higher attachment position allows detection range 16a of left front corner sonar unit 12a to be three-dimensionally covered by the angle of view 17 of second imaging section 14 easily. In addition, it is preferable that the optical axes of second imaging section 14 and left front corner sonar unit 12a substantially match with each other. As a result, misalignment of detection range 16a of left front corner sonar unit 12a within angle of view 17 of second imaging section 14 becomes smaller, which in turns, makes it possible to reduce the concern that detection range 16a of left front corner sonar unit 12a may partially protrude from the angle of view 17 of second imaging section 14.

Display section 13 includes, for example, a navigation apparatus, or a display provided to the rear seat. Display section 13 displays a combined image received from image processing section 3. It is preferable that this combined image be an image in which an overhead view image and a normal image are arranged in parallel. Such arrangement is used to prevent an object from disappearing due the presence of a blind spot in the vicinity of a boundary of the overhead view image.

Figure 5:
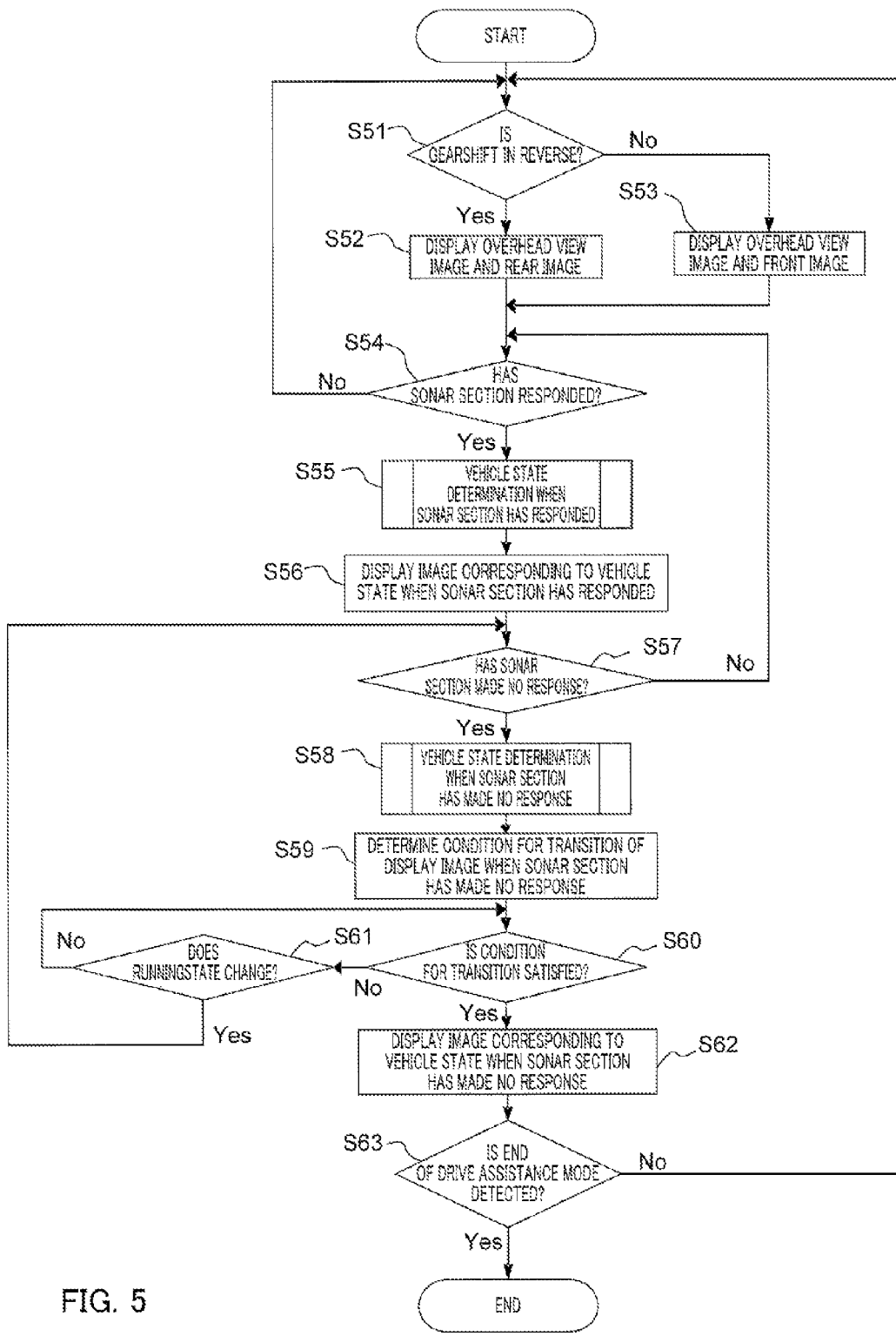
FIG. 5 is a flowchart illustrating drive assistance processing performed by a drive assistance apparatus according to an embodiment of the present invention.

FIG. 5 is a flowchart for drive assistance processing performed by control section 5.

First, as indicated in step S51, control section 5 determines whether gearshift 11 is in reverse on the basis of the gearshift signal received from gearshift 11.

In the case of YES in step S51, image processing section 3 creates an overhead view image using images captured by first imaging section 7 and then acquired from volatile memory 2, in response to a command from control section 5. In addition, as indicated in step S52, display section 13 displays the created overhead view image in parallel with a rear image captured by rear camera 7d and then acquired from volatile memory 2.

Next, in the case of NO in step S51, as indicated in step S53, image processing section 3 creates an overhead view image using images captured by first imaging section 7 and acquired from volatile memory 2, in response to a command of control section 5, and display section 13 displays the created overhead view image in parallel with a front image captured by front camera 7a and acquired from volatile memory 2.

Next, as indicated in step S54, control section 5 determines whether an object is exists at the left front corner of the host vehicle on the basis of a detection result of sonar section 12. That is, control section 5 determines whether left front corner sonar unit 12a has detected an object. In the case of NO in step S54, the processing of step S51 is performed again.

Meanwhile, in the case of YES in step S54, as indicated in step S55, control section 5 determines the vehicle state when sonar section 12 has responded. As indicated in step S56, image processing section 3 causes display section 13 to display an image corresponding to the vehicle state when sonar section 12 has responded. To be more specific, when left front corner sonar unit 12a detects an object, image processing section 3 newly creates an overhead view image using images captured by first imaging section 7 and an image captured by second imaging section 14 and causes display section 13 to display the created overhead view image. In addition, display section 13 displays the image captured by second imaging section 14 in parallel with this overhead view image. In this case, image processing section 3 may cause display section 13 to display, in an enlarged manner, a part of the image captured by second imaging section 14. Image processing section 3 may also cause display section 13 to display, in an enlarged manner, a part of the created overhead view image that includes an image region captured by second imaging section 14, instead of causing display section 13 to display the image captured by second imaging section 14. Note that, if gearshift 11 is in reverse when left front corner sonar unit 12a has detected an object, image processing section 3 may cause display section 13 to display the image captured by rear camera 7d instead of the image captured by second imaging section 14, in parallel with the overhead view image. Moreover, when a rear sonar unit of sonar section 12 has responded, the image displayed in step S52 or step S53 remains the same as the original overhead view image using the images captured by first imaging section 7, and an indicator indicating the detection of an object is added or the background color of screen is changed.

Next, as indicated in step S57, control section 5 determines whether the object at the left front corner of the host vehicle no longer exists, on the basis of a result of detection by sonar section 12. More specifically, control section 5 determines whether left front corner sonar unit 12a no longer detects the object.

In the case of NO in step S57, the processing of step S54 is performed again. Meanwhile, in the case of YES in step S57, control section 5 determines the vehicle state when sonar section 12 no longer responds.

As indicated in step S59, control section 5 determines a transition condition for the display image when sonar section 12 no longer responds, on the basis of the vehicle state when sonar section 12 has responded in step S55 and the vehicle state when sonar section 12 no longer responds in step S58.

As indicated in step S60, control section 5 determines whether the transition condition determined in step S59 is satisfied. In the case of NO in step S60, as indicated in step S61, control section 5 determines whether the running state of the host vehicle has changed. In the case of NO in step S61, control section 5 performs the processing of step S60 again because the transition condition for the image to be displayed that is determined in step S59 does not change. Meanwhile, in the case of YES in step S61, control section 5 performs the processing of step S57 again because the vehicle state of step S58 used for determining the transition condition for the image to be displayed in step S59 changes.

In the case of YES in step S60, image processing section 3 causes display section 3 to display the image corresponding to the vehicle state when sonar section 12 no longer responds, because the transition condition for the image to be displayed has been satisfied. Stated differently, display section 13 displays the overhead view image and rear image of step S52 when the gearshift 11 is in reverse or displays the overhead view image and front image of step S53 when gearshift 11 is not in reverse (e.g., in drive or park).

After the processing in step S62, as indicated in step S63, control section 5 determines whether end of the drive assistance mode has been detected. In the case of YES in step S63, control section 5 ends the drive assistance processing. Upon reception of the end of drive assistance mode as input from input section 8, for example, control section 5 ends the drive assistance processing. Meanwhile, in the case of NO in step S63, control section 5 performs the processing of step S51 again.

Figure 6:
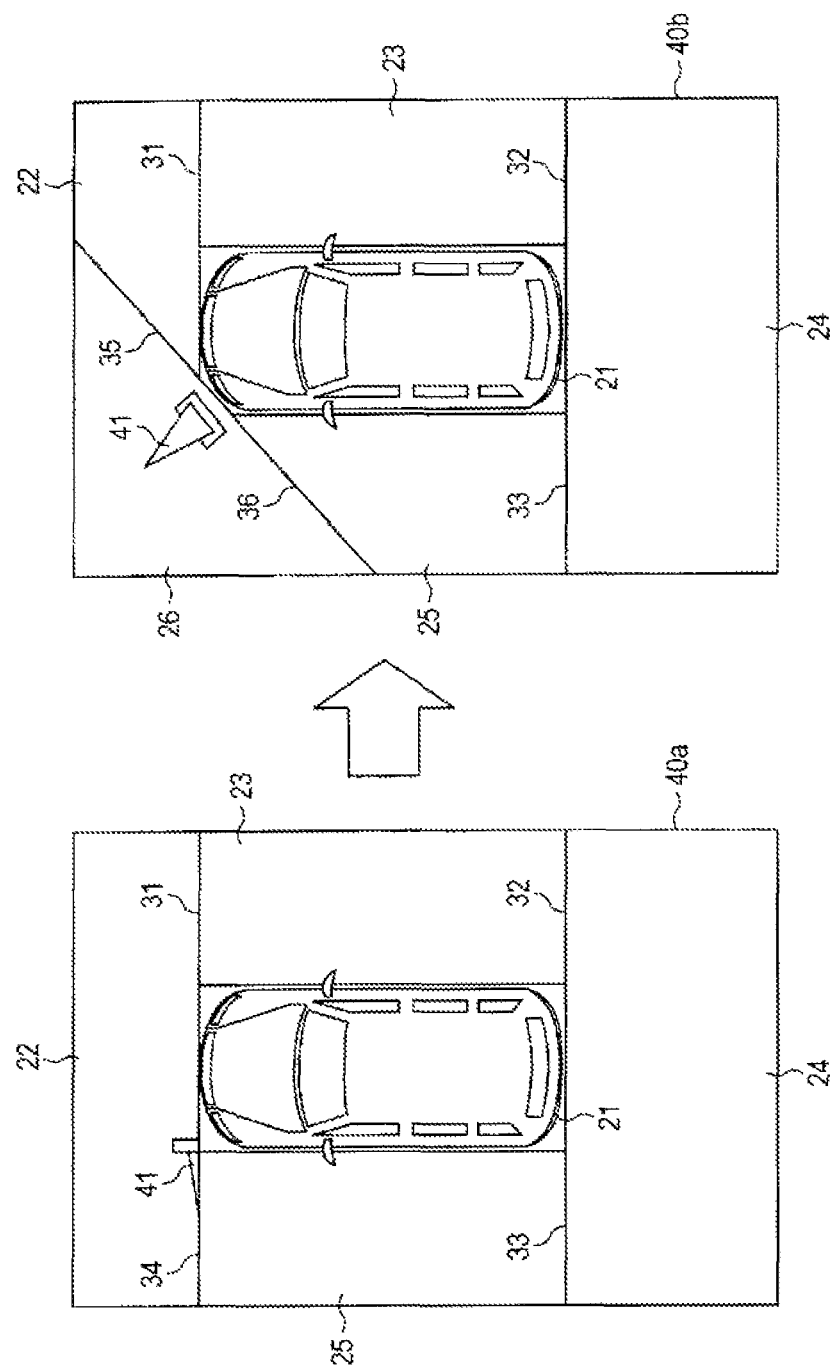
FIG. 6 is a diagram illustrating how an overhead view image is combined with an image when an object is detected by an object detector that is a primary portion of FIG. 1.

Next, a description will be given of a difference between the overhead view image created in step S56 when left front corner sonar unit 12a has detected an object and an ordinary overhead view image created using the images captured by four cameras 7a to 7d of first imaging section 7. FIG. 6 is a diagram for describing the overhead view image created in step S56.

As illustrated in the left half of FIG. 6, image processing section 3 creates overhead view image 40a using the images captured by four cameras 7a to 7d of first imaging section 7, before left front corner sonar unit 12a detects an object. Image 21 of the host vehicle is superimposed on the center part of overview head image 40a. Regions 22 to 25 of overhead view image 40a correspond to viewpoint-converted images of the images captured by front camera 7a, right camera 7b, rear camera 7d, and left camera 7c, respectively. The junction surfaces of regions 22 to 25 are represented as combination boundaries 31 to 34, respectively. When left front corner sonar unit 12a detects object 41 in the vicinity of the host vehicle, unless a change is made to the overhead view image created using the four images captured by four cameras 7a to 7d of first imaging section, a blind spot may be generated on combination boundary 34, and object 41 may disappear.

For this reason, upon detection of an object by left front corner sonar unit 12a, as illustrated in FIG. 6, image processing section 3 creates overhead view image 40b using the image captured by second imaging section 14, in addition to the images captured by four cameras 7a to 7d of first imaging section 7. Second imaging section 14 is configured to capture an image of the left front corner where object 41 has been detected. Regions 22 to 26 of overhead view image 40 correspond to the viewpoint-converted images of the images captured by front camera 7a, right camera 7b, rear camera 7d, left camera 7c, and second imaging section 14, respectively. Combination boundary 35 between front camera 7a and second imaging section 14, and combination boundary 36 between left camera 7c and second imaging section 14 are set to the positions that allow region 26 of the view point converted image captured by second imaging section 14 to include the detection range covered by left front corner sonar unit 12a. Stated differently, combination boundaries 35 and 36 are set outside of the detection range covered by left front corner sonar unit 12a. Thus, object 41 detected by left front corner sonar unit 12a will not disappear in the vicinity of combination boundaries 35 and 36 on overhead view image 40b, and the visibility of object 41 in region 26 is kept. To be more specific, a sudden change in how object 41 falls down in the vicinity of the combination boundaries no longer occurs, so that the driver can visually know the presence of object 41 without a feeling of strangeness. In addition, object 41 falls down in a direction radially leaving from the vehicle as a base point, so that the driver can intuitively know the position and direction of object 41.

Note that, normally, it is preferable to set combination boundaries 35 and 36 close to the angle of view of second imaging section 14 as much as possible in order to locate object 41 away from combination boundaries 35 and 36 as far as possible. However, when combination boundaries 35 and 36 are set substantially equal to the angle of view of second imaging section 14, unwanted reflection outside of the intended angle of view would occur if second imaging section 14 shifts from the installation position. For this reason, it is preferable to set combination boundaries 35 and 36 to the positions located approximately several to tens of degrees inward with respect to the angle of view of second imaging section 14.

Figure 7:
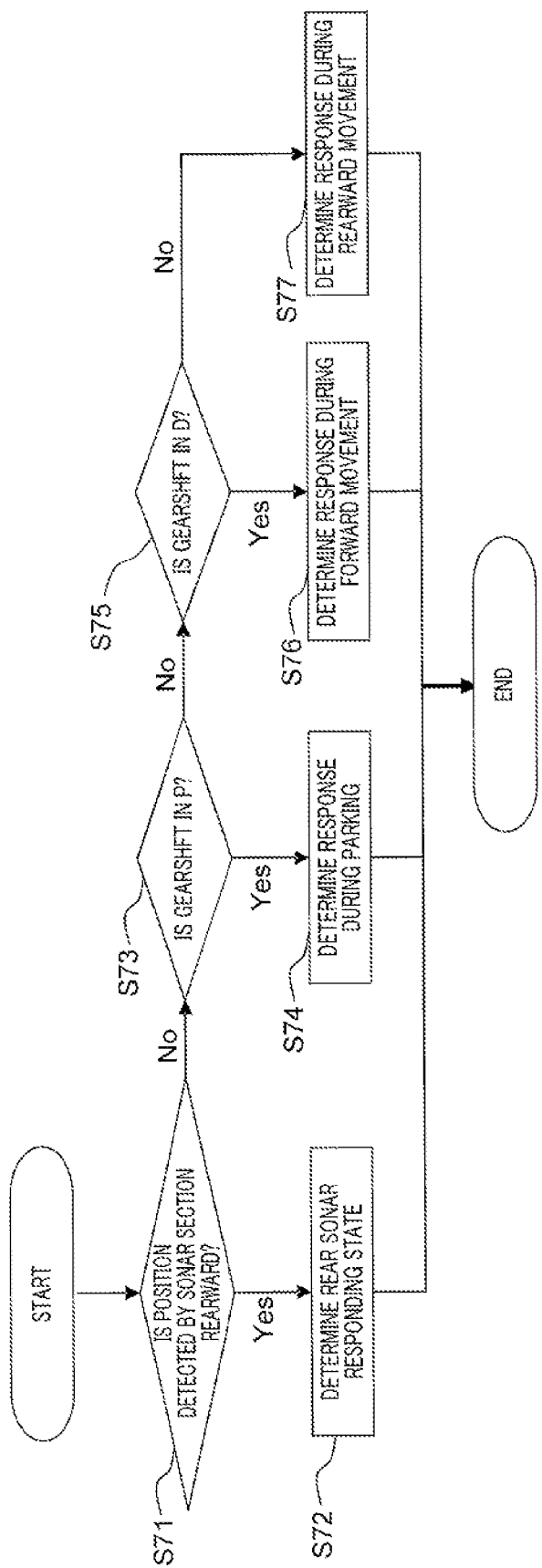
FIG. 7 is a flowchart for describing how a vehicle state when a sonar unit responds is determined in step S55 of FIG. 5.

Next, a description will be given of determination processing for the vehicle state when sonar section 12 has responded in step S55. FIG. 7 is a flowchart for describing the processing in step S55 in FIG. 5.

As indicated in step S71 of FIG. 7, control section 5 determines whether the sonar unit of sonar section 12 that has detected an object is a sonar unit that is installed on the rear part of the vehicle. In the case of YES in step S71, as indicated in step S72, control section 5 determines the state in which the sonar unit of sonar section 12 on the rear part of the host vehicle has responded.

Meanwhile, in the case of NO in step S71, as indicated in step S73, control section 5 determines whether gearshift 11 is in park. In the case of YES in step S73, as indicated in step S74, control section 5 determines that sonar section 12 has responded during parking.

In the case of NO in step S73, as indicated in step S75, control section 5 determines whether gearshift 11 is in drive. In the case of YES in step S75, as indicated in step S76, control section 5 determines that sonar section 12 has responded during forward movement (e.g., forward movement to exit from parking lot).

Next, in the case of NO in step S75, as indicated in step S77, control section 5 determines that sonar section 12 has responded during backward movement (e.g., backward movement for parking).

Figure 8:
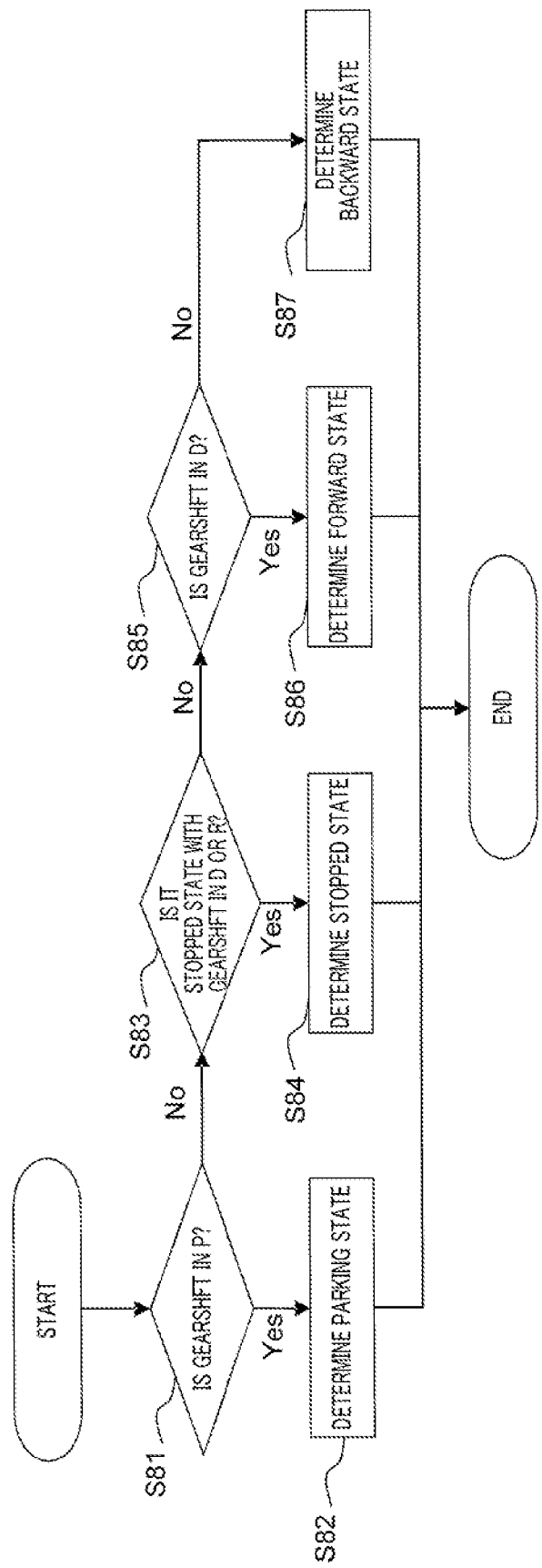
FIG. 8 is a flowchart for describing how a driving state when no sonar unit responds is determined in step S58 of FIG. 5.

Next, a description will be given of determination processing for the vehicle state when sonar section 12 no longer responds in step S58. FIG. 8 is a flowchart for describing the processing in step S58 in FIG. 5.

As indicated in step S81 of FIG. 8, control section 5 determines whether gearshift 11 is in park. In the case of YES in step S81, as indicated in step S82, control section 5 determines that the host vehicle is parked.

Meanwhile, in the case of NO in step S81, as indicated in step S83, control section 5 determines whether the host vehicle is stopped with vehicle speed of vehicle speed sensor 9 being zero and gearshift 11 in drive or reverse. In the case of YES in step S83, as indicated in step S84, control section 5 determines that the host vehicle is stopped.

Meanwhile, in the case of NO in step S83, as indicated in step S85, control section 5 determines whether gearshift 11 is in drive. In the case of YES in step S85, as indicated in step S86, control section 5 determines that the host vehicle is moving forward.

Meanwhile, in the case of NO in step S85, as indicated in step S87, control section 5 determines that the host vehicle is moving backward.

Next, a description will be given of the transition conditions in step S59. FIG. 9 is a diagram for describing the transition conditions in step S59.

As indicated in FIG. 9, the transition conditions for a display image in step S59 are set to 16 scenes in combination of four running states of the host vehicle when sonar section 12 has detected an object and four running states of the host vehicle when sonar section 12 no longer detects the object. In this embodiment, a description will be given with a parallel parking situation, which occurs most often among the expected parking scenes.

First, control section 5 estimates the state of the host vehicle by determining the four running states of the host vehicle when sonar section 12 has responded. To be more specific, when a sonar unit of sonar section 12 on the front part of the host vehicle has responded, control section 5 estimates that the host vehicle is stopped, if the state of the gearshift is in park. In addition, if gearshift 11 is in drive, control section 5 estimates that the host vehicle is running forward (e.g., forward movement to exit from parking lot) and also that sonar section 12 has responded to a parked vehicle, a wall or a poll in the forward direction of the host vehicle. Meanwhile, if gearshift 11 is in reverse, control section 5 estimates that the host vehicle is running backward (e.g., backward movement for parking) and also that sonar section 12 has responded to a parked vehicle, a wall or a poll in the forward direction of the host vehicle. When a sonar unit of sonar section 12 on the rear part of the host vehicle has responded, however, control section 5 disregards the state of the host vehicle.

Next, control section 5 estimates the state of the host vehicle by checking the running state of the host vehicle when sonar section 12 ends the detection of object and thus no longer responds. When gearshift 11 is in park, control section 5 estimates that the host vehicle is stopped and that the object has moved away from the host vehicle or the host vehicle is parked or stopped (scenes 1, 5, 9, and 13). Moreover, when the host vehicle is stopped with the vehicle speed of vehicle speed sensor 9 being zero and gearshift 11 in drive or reverse, control section 5 estimates that the driver is thinking about a different driving operation or is about to switch between the drive and reverse operations (scenes 2, 6, 10, and 14). In addition, if gearshift 11 is in drive when sonar section 12 responds while the host vehicle is moving with gearshift 11 in drive, control section 5 estimates that the host vehicle is moving after the driver made a judgment that the host vehicle would not collide with the object (scene 7). Meanwhile, if gearshift 11 is in reverse when sonar section 12 responds while the host vehicle is moving with gearshift 11 in drive, control section 5 estimates that the driver is making a three-point turn (scene 11). Meanwhile, if gearshift 11 is in drive when sonar section 12 responds while the host vehicle is moving with gearshift 11 in reverse, control section 5 estimates that the driver is making a three-point turn (scene 8). Meanwhile, if gearshift 11 is in reverse when sonar section 12 responds while the host vehicle is moving with gearshift 11 in drive, control section 5 estimates that the host vehicle is moving after the driver made a judgment that the host vehicle would not collide with the object (scene 12).

Next, a description will be given of primary scenes of FIG. 9 using images.

Figure 10:
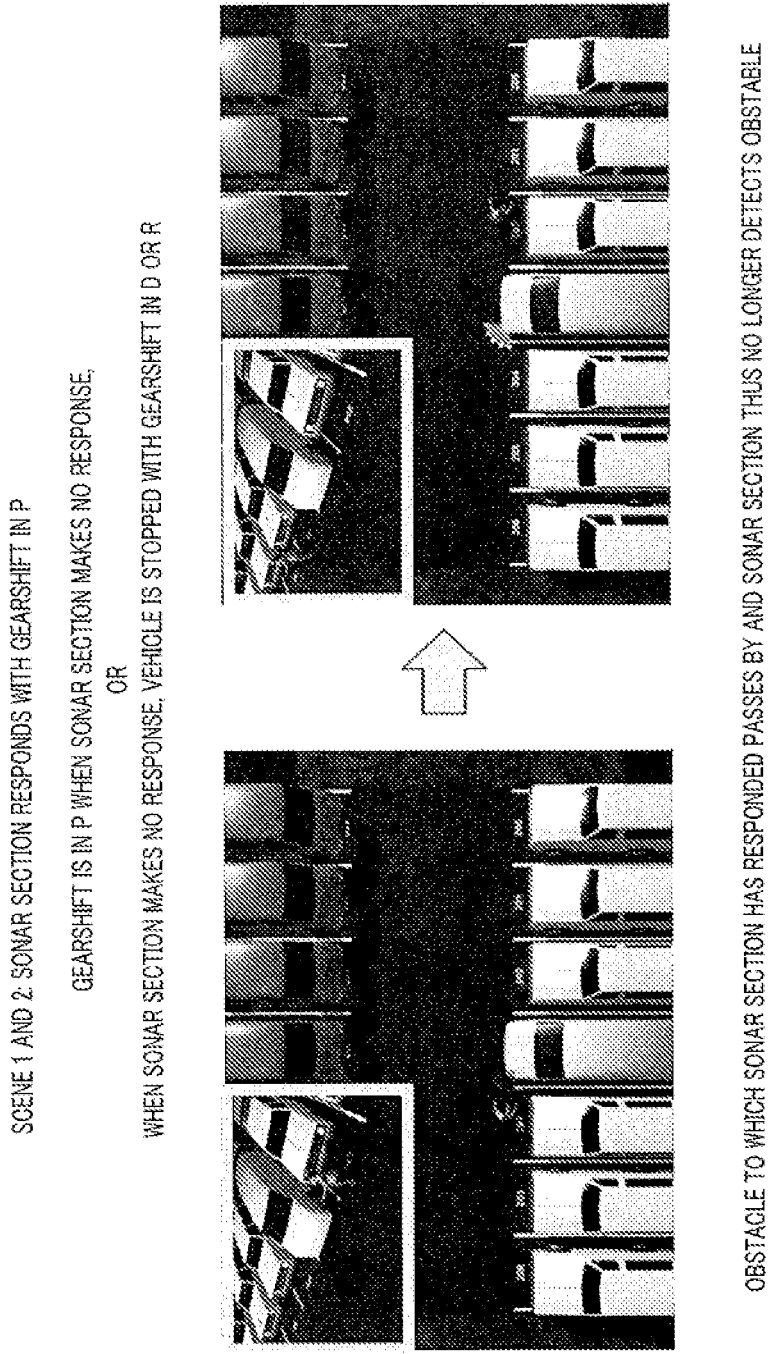
FIG. 10 is a diagram for describing scenes 1 and 2 of FIG. 9 using images.

FIG. 10 is a diagram for describing scenes 1 and 2 using images. FIG. 10 represents a state where gearshift 11 is in park when left front corner sonar unit 12a detects an object, and when left front corner sonar unit 12a no longer detects the object, gearshift 11 is in park (scene 1) or in drive or reverse and the host vehicle is stopped with the vehicle speed of vehicle sensor 9 being zero (scene 2). In scene 1, the object is leaving from the host vehicle, so that the display image may be switched as soon as the object is no longer detected. In scene 2, the object is leaving from the host vehicle in a state where the driver switches gearshift 11 while the host vehicle is stopped (has not departed yet), so that the display image may be switched as soon as the object is no longer detected. Accordingly, transition conditions T1 and T2 of scenes 1 and 2 are both set to a value close to zero (e.g., 1 sec).

Figure 11:
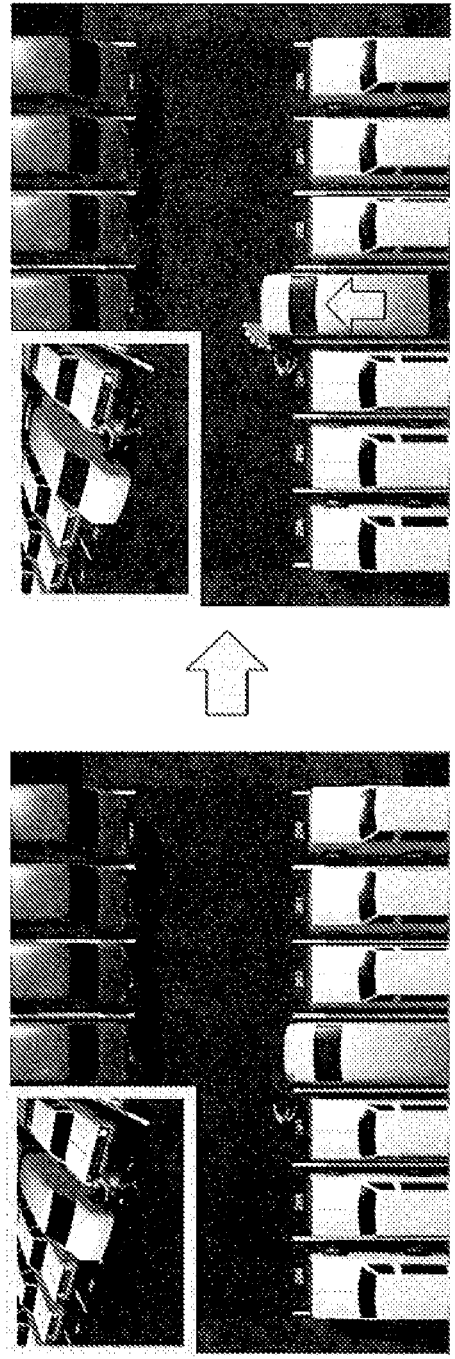
FIG. 11 is a diagram for describing scene 3 of FIG. 9 using images.

FIG. 11 is a diagram for describing scene 3 of FIG. 9 using images. Scene 3 represents a state where gearshift 11 is in park when left front corner sonar unit 12a detects an object, and when left front corner sonar unit 12a no longer detects the object, gearshift 11 is in drive. In scene 3, the object approaches to the host vehicle, but the host vehicle is moving forward to avoid the object. Accordingly, even after left front corner sonar unit 12a no longer detects the object, the displaying of the image on the screen needs to be continued to some extent until the host vehicle successfully avoids the object. For this reason, the transition condition for scene 3 is set to distance D3, which corresponds to the distance until the host vehicle actually ends the movement to avoid the object. In this case, the displaying of the image on the screen needs to be continued until the object becomes no longer visible on the screen, so that D3 is set to about several 10 cm, for example. Note that, the displaying of the image on the screen needs to be continued in scene D4 as well in the same manner as that of D3, so that a value close to that of D3 is set for D4.

Figure 12:
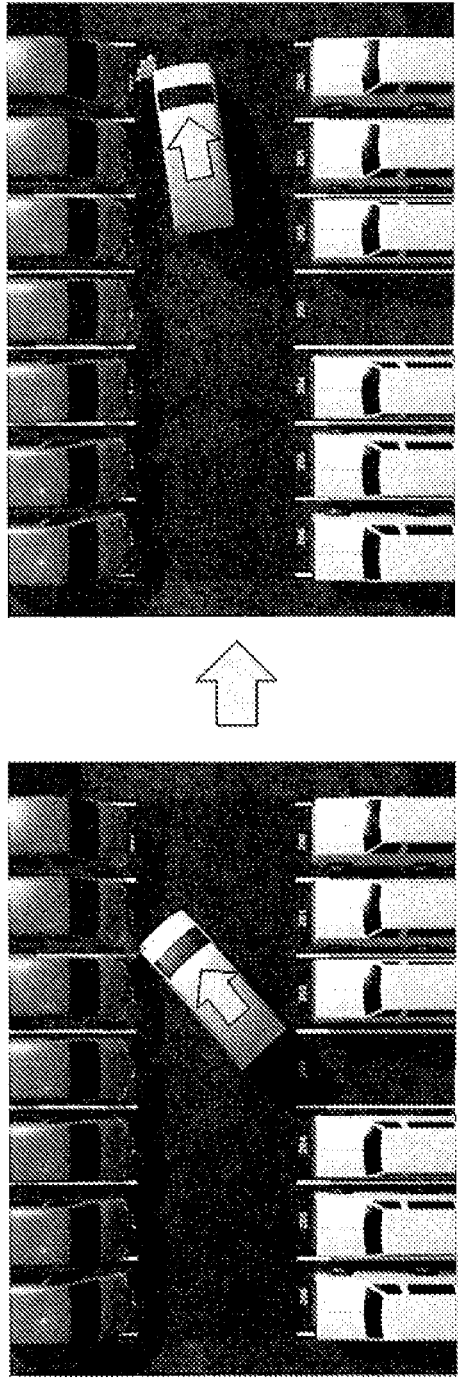
FIG. 12 is a diagram for describing scene 7 of FIG. 9 using images.

FIG. 12 is a diagram for describing scene 7 of FIG. 9 using images. Scene 7 represents a state where gearshift 11 is in drive when left front corner sonar unit 12a detects an object, and when left front corner sonar unit 12a no longer detects the object, the host vehicle is moving with gearshift 11 in drive. In scene 7, the driver has made a judgment that the host vehicle would not collide with the vehicles parked in front of the host vehicle and thus moves the host vehicle, and left front corner sonar unit 12a no longer detects the object as a result. In this case, it is preferable to continue displaying, on the screen, the region avoided by forward movement to some extent even after left front corner sonar unit 12a no longer detects the object. For this reason, the transition condition for scene 7 is set to distance D7. It is preferable to set D7 to allow for a distance similar to that of D3 or D4 because it is preferable to continue the displaying of the image on the screen until the object becomes no longer visible on the screen.

Figure 13:
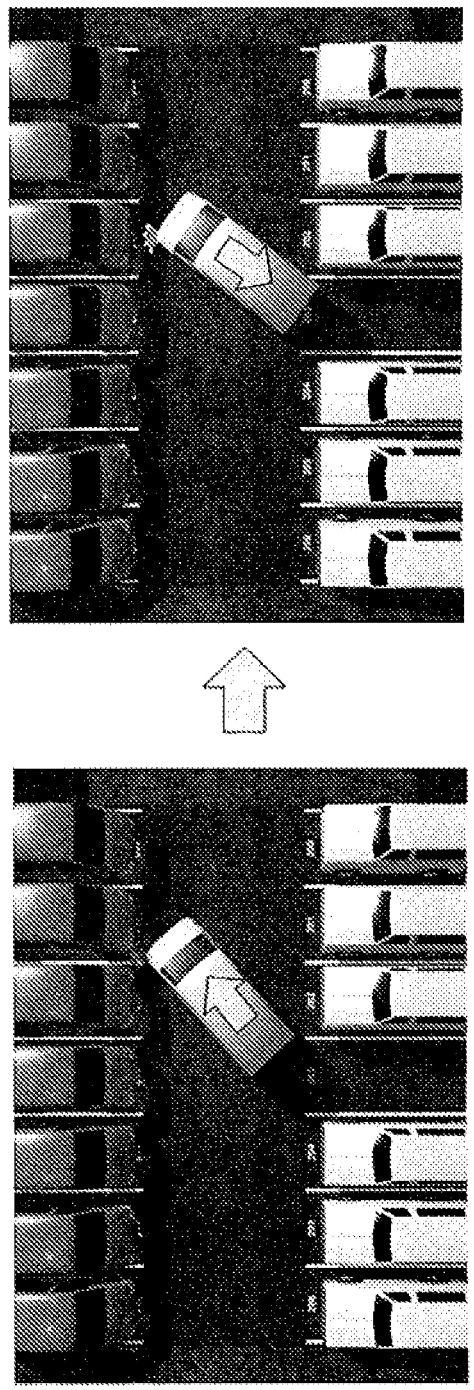
FIG. 13 is a diagram for describing scene 8 of FIG. 9 using images.

FIG. 13 is a diagram for describing scene 8 of FIG. 9 using images. Scene 8 represents a state where gearshift 11 is in drive when left front corner sonar unit 12a detects an object, and when left front corner sonar unit 12a no longer detects the object, the host vehicle is moving with gearshift 11 in reverse. In scene 8, the object is no longer detected when the host vehicle moves backward to make a three-point turn. In this case, it is preferable to continue displaying the region avoided by backward movement to some extent even after left front corner sonar unit 12a no longer detects the object. For this reason, the transition condition for scene 8 is set to distance D8. It is preferable to set D8 to allow for a distance similar to that of D3 or D4 as in the case of D7, because it is preferable to continue the display operation on the screen until the object becomes no longer visible on the screen.

Note that, scene 6 represents a state where gearshift 11 is in drive when left front corner sonar unit 12a detects an object, and when the object is no longer detected, the host vehicle is stopped with the vehicle speed of vehicle speed sensor 9 being zero and gearshift 11 in drive or reverse. In scene 6, it is estimated that the driver is either thinking about the next (different) action or switching the gearshift from drive to reverse or vice versa. Accordingly, the transition condition may be set to T6, which is a predetermined time longer than T1. In addition, scene 5 represents a state where gearshift 11 is in drive when left front corner sonar unit 12a detects an object, and when left front corner sonar unit 12a no longer detects the object, gearshift 11 is in park. In this case, it is estimated that, in scene 5, the host vehicle is parked or stopped after the running state shifts from scenes 6 to 8. For this reason, the display image can be switched right away. Accordingly, transition condition T5 is set to a value substantially equal to the value of T1.

Figure 14:
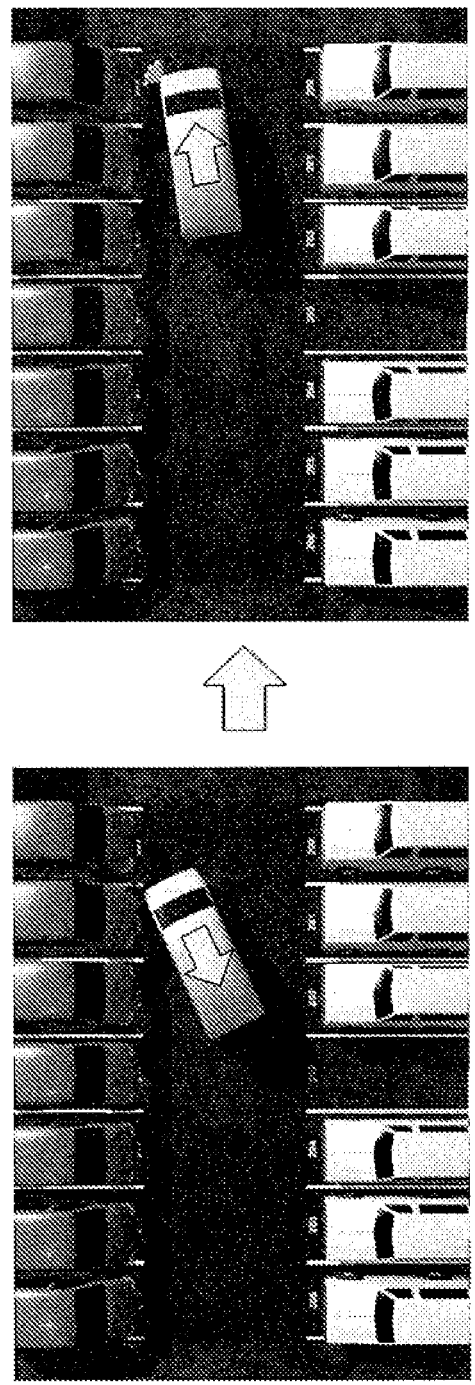
FIG. 14 is a diagram for describing scene 11 of FIG. 9 using images.

FIG. 14 is a diagram for describing scene 11 of FIG. 9 using images. Scene 11 represents a state where gearshift 11 is in reverse when left front corner sonar unit 12a detects an object, and when left front corner sonar unit 12a no longer detects the object, the host vehicle is moving with gearshift 11 in drive. In scene 11, the object is no longer detected when the host vehicle moves backward to make a three-point turn. In this case, it is preferable to continue displaying the region avoided by backward movement to some extent even after left front corner sonar unit 12a no longer detects the object. For this reason, the transition condition for scene 11 is set to distance D11. It is preferable to set D11 to allow for a distance similar to that of D3 or D4 as in the case of D7 or D8, because it is preferable to continue the displaying of the image on the screen until the object becomes no longer visible on the screen.

Figure 15:
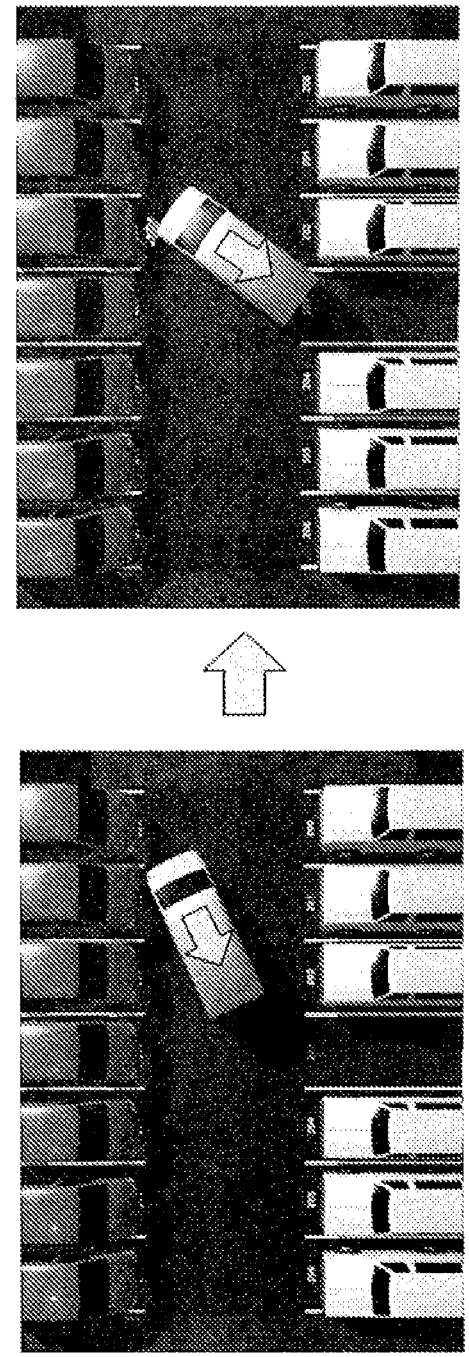
FIG. 15 is a diagram for describing scene 12 of FIG. 9 using images.

FIG. 15 is a diagram for describing scene 12 of FIG. 9 using images. Scene 12 represents a state where gearshift 11 is in reverse when left front corner sonar unit 12a detects an object, and when left front corner sonar unit 12a no longer detects the object, the host vehicle is moving with gearshift 11 in reverse. In scene 12, the driver has made a judgment that the host vehicle would not collide with the object and thus moves the host vehicle, and left front corner sonar unit 12a no longer detects the object as a result. In this case, it is preferable to continue displaying, on the screen, the region avoided by backward movement to some extent even after left front corner sonar unit 12a no longer detects the object. For this reason, the transition condition for scene 12 is set to distance D12. It is preferable to set D12 to allow for a distance similar to that of D3 or D4 as in the case of D7, D8, or D11, because it is preferable to continue the displaying of the image on the screen until the object becomes no longer visible on the screen.

Note that, scene 10 represents a state where gearshift 11 is in reverse when left front corner sonar unit 12a detects an object, and when left front corner sonar unit 12a no longer detects the object, the host vehicle is stopped with the vehicle speed of vehicle speed sensor 9 being zero and gearshift 11 in drive or reverse. In scene 10, it is estimated that the driver is either thinking about the next (different) action or switching the gearshift from drive to reverse or vice versa. Accordingly, the transition condition may be set to T10, which is a predetermined time longer than T1. In addition, scene 9 represents a state where gearshift 11 is in reverse when left front corner sonar unit 12a detects an object, and when left front corner sonar unit 12a no longer detects the object, gearshift 11 is in park. In this case, it is estimated that, in scene 9, the host vehicle is parked or stopped after the running state shifts from other scenes 10 to 12. For this reason, the displaying of the image can be switched right away. Accordingly, transition condition T9 is set to a value substantially equal to the value of T1.

In addition, when a sonar unit of sonar section 12 on the rear part of the host vehicle detects an object, the image to be displayed is the overhead view image and rear image captured by first imaging section 7 indicated in step S52, or the overhead view image and front image captured by first imaging section 7 indicated in step S53. Thus, even when sonar unit 12 no longer detects the object, the display content does not change. In this case, the display image may be transitioned as soon as the object is no longer detected in scenes 13 to 16. For this reason, transition conditions T13 to T16 for scenes 13 to 16 are set to a value substantially equal to the value of T1.

As has been described above, according to the present invention, control section 5 determines the transition condition for the display image on display section 13 on the basis of the running state of the host vehicle when sonar section 12 detects an object and the running state of the host vehicle when sonar section 12 no longer detects the object. Thus, displaying of an overhead view image created using five cameras to eliminate a blind spot in the vicinity of an object, to be performed upon detection of the object is continued in accordance with the drive state in a case where the object is no longer within the detection range covered by sonar section 12 but still exists near the host vehicle. Thus, the driver can visually know the presence of the object that exists close enough to the host vehicle to be even captured by the second imaging section and that may possibly collide with the host vehicle, until the object is positioned outside the capturing range of the second imaging section, for example. As a result, the degree of safety can be improved.

In this embodiment, an assumption is made that the host vehicle includes the steering wheel on the right side. Thus, second imaging section 14 and left front corner sonar unit 12a provided at the left front corner are used to prevent an object in the vicinity of the left front corner that is likely to become a blind spot for the driver, from disappearing on the overhead view image. Meanwhile, when the host vehicle includes the steering wheel on the left side, the target position becomes the right front region instead of the left front region. More specifically, when the host vehicle includes the steering wheel on the left side, the installation position of second imaging section 14 in this embodiment becomes the right front corner, and right front corner sonar unit 12b is used instead of left front corner sonar unit 12a.

More specifically, second imaging section 14 captures an image of the front corner of the four corners of the host vehicle that is in the direction opposite to the position of the steering wheel of the host vehicle. The angle of view of second imaging section 14 includes the detection range covered by the sonar unit of sonar section 12 that detects an object at the front corner in the direction opposite to the position of the steering wheel of the host vehicle. Upon detection of an object by the sonar unit of the soar section 12, image processing section 3 creates an overhead view image by combining images captured by first imaging section 7 and an image captured by second imaging section 14, and sets the detection range covered by the sonar unit to be included in the region of the overhead view image based on the image captured by second imaging section 14 in this overhead view image. Meanwhile, when the sonar unit does not detect an object at the front corner in the direction opposite to the position of the steering wheel of the host vehicle, image processing section 3 creates an overhead view image by combining the images captured by first capturing section 7.

Note that, although sonar section 12 includes four sonar units 12e to 12f for detecting an object in the front and rear of the vehicle in this embodiment, two sonar units may be sufficient to detect an object in the front and rear of the vehicle at least.

In this embodiment, sonar section 12 is configured of a plurality of sonar units. When a plurality of sonar units have detected an object, control section 5 determines the sonar unit that has detected the object closest to the host vehicle to be the sonar unit that has detected an object.

In addition, although sonar section 12 is used as the object detector for detecting an object in this embodiment, a different sensor such as infrared sensor may be used, for example, as long as the sensor is configured to detect an object.

The disclosure of Japanese Patent Application No. 2011-274174, filed on Dec. 15, 2011, including the specification, drawings and abstract, is incorporated herein by reference in its entirety.

INDUSTRIAL APPLICABILITY

The drive assistance apparatus according to the present invention is useful in that, when a sonar unit or the like detects an object at one of four corners of a host vehicle, the object is displayed on an overhead view image without disappearing from the image so that the driver can visually know the presence of the object easily.

REFERENCE SIGNS LIST

1 Drive assistance apparatus
3 Image processing section
5 Control section
7 First imaging section
12 Sonar section
14 Second imaging section

The invention claimed is:
1. A drive assistance apparatus comprising:
   a first imaging section that captures an image of a region around a vehicle on which the first imaging section is installed;
   an object detecting section that detects an object around the vehicle;
   a second imaging section that captures an image of a region around a corner of the vehicle where the object has been detected, the corner being a front corner of the vehicle opposite to a side of a steering wheel of the vehicle;

a running state detecting section that detects a running state of the vehicle;

an image combining section that periodically creates an overhead view image by combination, based on the captured images of the region around the vehicle that has been received from the first imaging section before the object has been detected or from the first imaging section and the second imaging section when the object has been detected;

a display section that displays the overhead view image created by combination by the image combining section; and a control section that controls transition of a display image of the display section, based on a detection result of the object detecting section and a detection result of the running state detecting section, wherein:

if the object detecting section has detected the object, the image combining section creates a new overhead view image based on the images captured by the first imaging section and on the image captured by the second imaging section and the display section displays the newly created overhead view image, and if the object detecting section no longer detects the object, the control section determines a transition condition based on the running state of the vehicle detected by the running state detecting section and the display section continues to display the new overhead view image even after the object detecting section no longer detects the object.

2. The drive assistance apparatus according to claim 1, wherein the control section switches the display image of the display section when the vehicle moves a predetermined distance after the object detecting section no longer detects the object, in a case where the vehicle is stopped or is moving forward when the object detecting section has detected the object and then the vehicle is moving when the object detecting section has no longer detected the object.

3. The drive assistance apparatus according to claim 1, wherein the control section switches the display image of the display section when a first predetermined time passes after the object detecting section no longer detects the object, in a case where the vehicle is moving forward or backward when the object detecting section has detected the object and then the vehicle is stopped with a gearshift of the vehicle in drive or reverse when the object detecting section has no longer detected the object.

4. The drive assistance apparatus according to claim 3, wherein the control section switches the display image of the display section when a second predetermined time that is shorter than the first predetermined time passes, in a case where the gearshift of the vehicle is in park when the object detecting section has no longer detected the object.

5. The drive assistance apparatus according to claim 1, wherein the transition condition is a predetermined distance after the object detecting section no longer detects the object, in a case where the vehicle is stopped or is moving forward when the object detecting section has detected the object and then the vehicle is moving when the object detecting section has no longer detected the object.

6. The drive assistance apparatus according to claim 1, wherein the transition condition is a first predetermined time that passes after the object detecting section no longer detects the object, in a case where the vehicle is moving forward or backward when the object detecting section has detected the object and then the vehicle is stopped with a gearshift of the vehicle in drive or reverse when the object detecting section has no longer detected the object.

7. The drive assistance apparatus according to claim 1, wherein the first imaging section comprises four cameras installed on a vehicle body and configured to capture images of an entire periphery of the vehicle.

8. The drive assistance apparatus according to claim 1, wherein the second imaging section comprises at least one camera installed on the front corner of the vehicle.

* * * * *